April 17, 1951     S. P. CLARK     2,549,663
GLASSWARE SPOTTER FOR STACKERS
Filed Dec. 28, 1945     2 Sheets-Sheet 1

INVENTOR
Stanley P. Clark
BY Parham + Bates
ATTORNEYS

April 17, 1951 S. P. CLARK 2,549,663
GLASSWARE SPOTTER FOR STACKERS
Filed Dec. 28, 1945 2 Sheets-Sheet 2
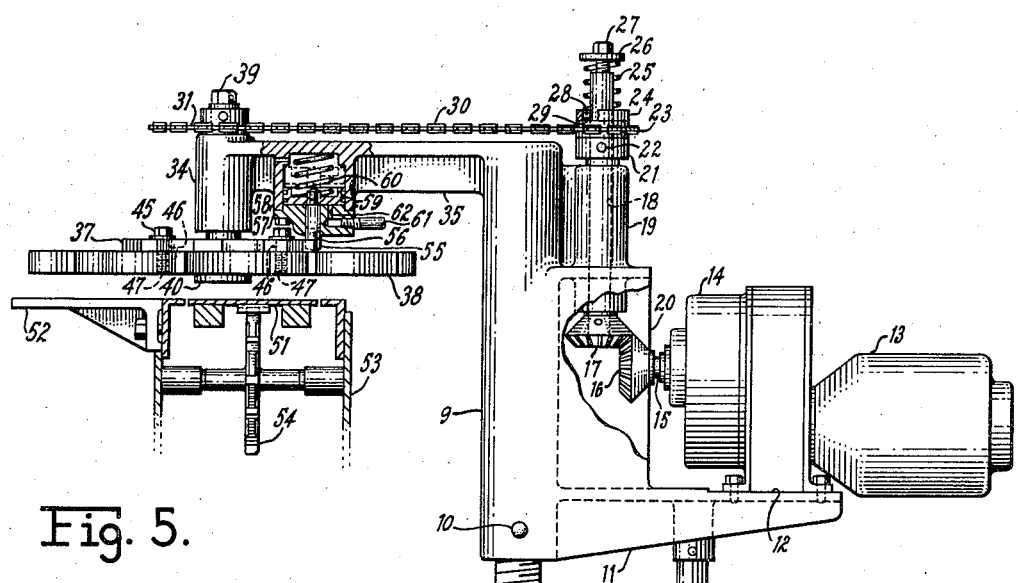
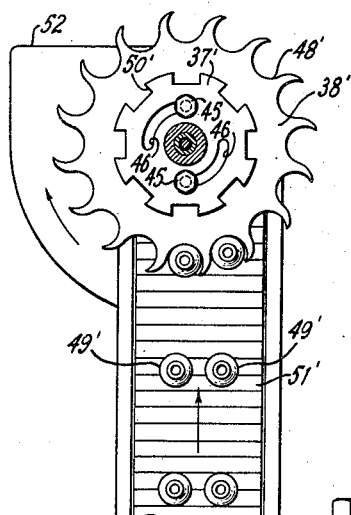
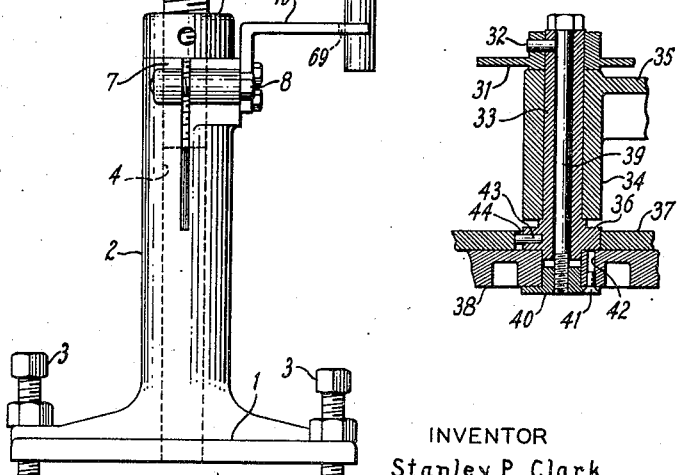
INVENTOR
Stanley P. Clark
BY Parham + Bates
ATTORNEYS Patented Apr. 17, 1951

2,549,663

UNITED STATES PATENT OFFICE 2,549,663

GLASSWARE SPOTTER FOR STACKERS

Stanley P. Clark, Windsor, Conn., assignor to Emhart Manufacturing Company, a corporation of Delaware Application December 28, 1945, Serial No. 637,722

2 Claims. (Cl. 214—1)

This invention relates generally to apparatus for handling articles of glassware and more particularly to a glassware spotter for taking articles of glassware from a support, as a moving conveyor onto which the articles were placed on their removal from a glassware forming machine, and for positioning the articles properly at a suitable place to permit them to be picked up by an associate stacker and transferred to another support, such as a moving lehr conveyor.

An object of the invention is to provide a glassware spotting mechanism which is unitary in structure and operation and will require but relatively little space on a factory floor or other supporting surface so that such spotting mechanism may be suitably positioned and used to take articles of glassware from an incoming or supply conveyor and to spot such articles properly for their removal by an associate stacker to an adjacent lehr conveyor more or less irrespective of the particular angular relation of the incoming or supply conveyor to the lehr conveyor.

A further object of the invention is to provide a glassware spotting mechanism which is adapted to spot articles of glassware, taken from an incoming or supply conveyor, in suitable positions to be picked up, a plurality at a time, by an associate stacker for transfer in that manner by the stacker to a nearby lehr conveyor.

A further object of the invention is to provide a glassware spotting mechanism in which a suitably mounted and positioned rotary spotting wheel is given regularly timed, intermittent indexing movements by a periodically broken and periodically restored driven connection with a continuously rotating driving element.

A still further object of the invention is to provide a glassware spotting mechanism that is relatively simple in construction, reliable in use, and sufficiently rapidly-acting to permit efficient use of associate glassware conveying and transferring mechanisms.

Other objects and advantages of the invention will hereinafter be pointed out or will become apparent from the following description of practical embodiments of the invention as illustrated in the accompanying drawings, in which:

Fig. 3 is a view, mainly in side elevation, with parts broken away and other parts shown in section, showing the details of the supporting structure of the device and of the means for intermittently rotating the spotting wheel;

Fig. 4 is a fragmentary vertical section view of the mounting of the glassware spotting wheel; and Fig. 5 is a fragmentary plan view of a modified form of glassware spotting mechanism.

Figure 1:
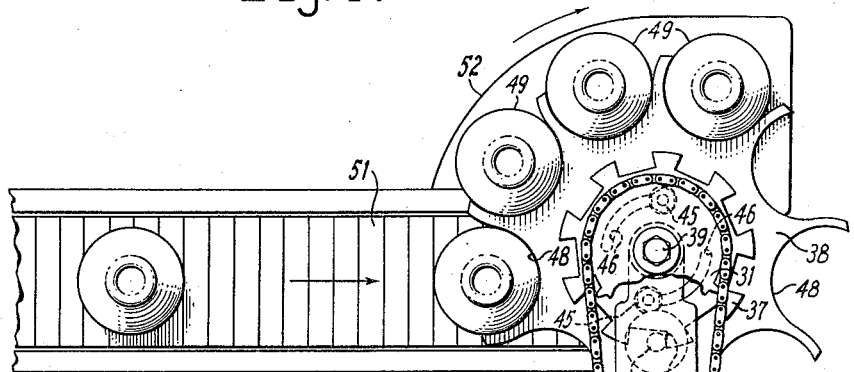
Fig. 1 is a plan view of a glassware spotting mechanism of the present invention operatively associated with an incoming or supply conveyor, only a fragmentary portion of the latter being shown.

Referring now more particularly to Fig. 3, the main supporting structure of a glassware spotting mechanism of the present invention may be in the form of a floor stand having a substantially flat base portion 1 (see also Fig. 1) on which there is an upright tubular member 2. The base 1 of the support may be supported upon a floor or other supporting surface, not shown, by jack screws 3. The bore 4 of the upright tubular member 2 is adapted to loosely receive the lower portion of a vertical, threaded rod 5. The vertical rod 5 is adjustably supported on the member 2, as by a nut 6 which rests on the upper end of the tube 2 and threadedly engages such rod. The upper end portion of the tube 2, indicated at 7, may be formed as a split collar, the component portions thereof being connected by a cap screw 8 which may be tightened to cause this portion of the column firmly to grip the portion of the threaded rod 5 therewithin, whereby to maintain the adjusted position of the rod in the tube 2.

The upper portion of the vertical threaded rod 5 carries a vertical cap sleeve 9, which may be affixed thereto, as at 10. An integral bracket arm 11 extends outwardly from the lower portion of the sleeve 9 and is suitably formed to provide a supporting base 12 for a driving unit which may comprise a reversible electric motor 13 and a suitably connected speed changing mechanism 14. This unit may be any one of a number of conventional such units. It has a driving shaft 15 from which motion may be imparted through a bevel gear 16 to a driven bevel gear 17 on the lower end of a second or intermediate driving shaft 18. The latter is rotatably mounted in a vertical bearing 19 which may be formed integrally with the upper portion of the sleeve 9 at the same side of the latter as the bracket arm 11. The enmeshed gears 16 and 17 may be located within a housing structure 20, the walls of which may be cast or otherwise formed integrally with a portion of the sleeve 9 directly above the supporting bracket arm 11.

The shaft 18 projects above the bearing 19. A collar 21 thereon may rest upon the upper end of the bearing and may be affixed to the shaft, as by a pin 22. Directly above the collar 21, the shaft 18 carries a horizontally disposed sprocket which is loose on the shaft. Another collar 24 is slidably mounted on the shaft 18 above the sprocket 23, being pressed firmly, although yieldingly, against such sprocket by a coil spring 25. The coil spring is disposed on the upper end portion of the shaft 18 between the collar 24 and a washer 26, the latter being retained in place by a bolt 27. The collar 24 may be prevented from turning on the shaft, as by a pin 28 projecting from the shaft into a vertical slot 29 in the inner periphery of the collar 24. The construction just described may be said to be that of a friction clutch or coupling which will turn the sprocket 23 with the rotating shaft 18 until sufficient resistance is opposed to such turning movement to cause slippage between the sprocket and the collars contacting therewith so that the rotation of the sprocket may cease during continued rotary movement of the shaft and of the parts affixed thereto. The amount of opposition to turning movement of the sprocket required to effect this result may be adjusted within limits by turning the bolt 27 to adjust the compression of the coil spring 25.

A chain 30, Figs. 1 and 3, is driven by the sprocket 23 and in turn drives a sprocket 31 which, as best seen in Fig. 4, is pinned at 32 to a vertically disposed tubular shaft 33 that is rotatably mounted in a vertical bearing 34 on the outer end portion of a bracket arm 35. The bracket arm 35 may be integral with the upper end portion of the sleeve 9. It extends laterally from the side of the latter opposite to the lower bracket arm 11, as best seen in Fig. 3. The tubular shaft 33 is provided at a level slightly above its lower end and below the lower end of the bearing 34 with a flange 36, Fig. 4, on which an angular indexing disk 37 is mounted. The indexing disk 37 rests upon a spotting wheel 38, Figs. 3 and 4. A bolt 39 extends downwardly through the tubular shaft 33. A nut 40 on the lower end portion of the bolt 39 may be tightened against the lower surface of the spotting wheel to clamp the latter against the flange 36 and to hold it on the extreme lower end portion of the tubular shaft 33. A dowel pin 41, carried by the nut 40, then projects into a vertical opening 42 in the spotting wheel 38 so as to prevent relative angular turning movement between the nut 40 and the spotting wheel 38 and, hence, between the spotting wheel and the tubular shaft 33 when the nut has been tightened to clamp the spotting wheel against the flange 36.

The flange 36 may carry an outwardly projecting pin 43 which extends into a vertical slot 44 in the inner periphery of the indexing disk 37. The indexing disk 37 may be fastened to the spotting wheel in angularly adjusted relation thereto by cap screws 45, Figs. 1 and 3, the shanks of which extend through arcuate slots 46 in the indexing disk into threaded engagement with vertical openings 47 in the underneath spotting wheel 38. In the example shown, the cap screws are spaced 180° apart and the threaded openings 37 extend completely through the spotting wheel 38 so that the latter may be inverted if desired for a purpose to be hereinafter explained.

The spotting wheel 38 is of a star wheel type, being provided with a plurality of regularly spaced peripheral pockets 48 each adapted to accommodate an article of glassware 49. In the example shown in Figs. 1 to 4, inclusive, the spotting wheel 38 has nine such peripheral pockets. The indexing disk 37 likewise has nine regularly spaced recesses or cutouts, designated 50, in its periphery. Each of the pockets 48 of the spotting wheel will be moved by a clockwise rotation of the spotting wheel from a position over an incoming or supply conveyor 51, Figs. 1 and 3, laterally of such conveyor above a dead plate 52. The conveyor supporting structure, which may be conventional, is indicated in part at 53 in Fig. 3 and may carry the dead plate 52. The conveyor 51 likewise is conventional and may be driven by any suitable means, represented by the sprocket 54 in Fig. 3, so as to advance the articles of glassware 49 thereon toward the spotting wheel. These may be disposed on the conveyor 51 in a single file order (see Fig. 2). Each such article will, in its turn, enter one of the pockets 48 of the spotting wheel. The clockwise rotary movement of the spotting wheel, as viewed in Fig. 1, will move that article from the conveyor 51 onto the dead plate 52, the article sliding from the conveyor onto and then on the dead plate in a known manner.

In order to stop the rotation of the spotting wheel periodically, a spring pressed plunger 55 is mounted above the indexing disk so as to engage with each of the peripheral recesses 50 of the indexing disk in turn and by reason of contact with the trailing side of that recess cause sufficient opposition to the rotation of the frictionally driven sprocket 23 to stop such rotation. The plunger or detent 55 extends slidably through an opening 56 in the lower head 57 of an air cylinder 58 which, except for such lower head, may be formed integrally with a portion of the bracket arm 35 (see Fig. 3). The plunger 55 is carried by a piston 59 in such cylinder. A compression coil spring 60 in the cylinder above the piston 59 exerts pressure on the latter so as to urge it continuously toward its downwardly projected position, in which it depends into one of the recesses 50 in the indexing disk. Periodically, however, the piston 59 is raised against the action of the spring 60 by a puff of air under pressure applied thereto through a pipe 61 and a port 62 in the lower cylinder head, so as to raise the plunger 55 out of such peripheral recess 50, thereby permitting resumed rotary movement of the indexing disk and the connected spotting wheel. The pipe 61 may lead to the cylinder from a suitable timer or timed air valve, which may be of conventional construction and mode of operation and therefore is shown only diametrically, at 63 in Fig. 2. Exhaust of the applied air from the lower part of the cylinder may be through this same air pipe and timer or timed valve in a manner well known. The arrangement is such that the rotary movement of the spotting wheel will be interrupted after each angular movement thereof for a distance equal to the angular distance between centers of two adjacent pockets 48. The spotting wheel and the indexing disk are adjusted angularly relative to each other at the time they are fastened together and fixed to the supporting shaft 33 so that a pocket 48 will be located in a suitable position over the conveyor 51 at each dwell of the spotting wheel to receive an article of glassware from the conveyor and one or more other of the pockets will be suitably positioned over the dead plate 52 to permit the article or articles therein to be picked up by an associate stacker or the like.

Figure 2:
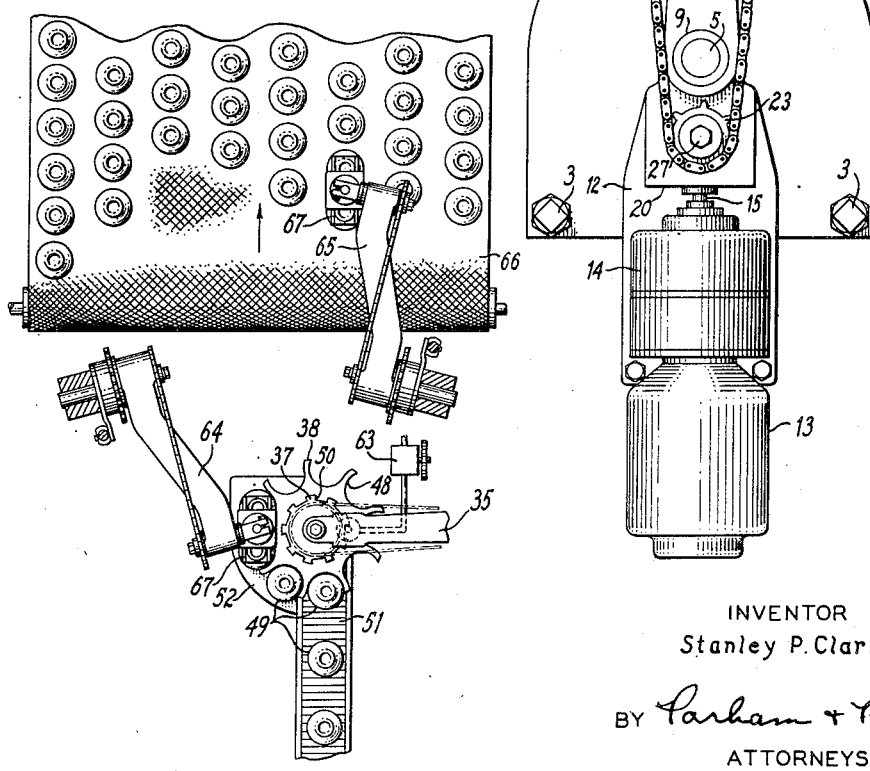
Fig. 2 is a relatively reduced view showing in plan the glassware handling parts of the spotting mechanism as operatively applied to the incoming or supply conveyor and in an operative position in relation to the glassware transferring parts of an associate stacker and to a lehr conveyor onto which the glassware is to be stacked.

The spotting mechanism is adapted for use with a stacker such as that which is known commercially as the Hartford-Empire Mechanical Stacker, an example of which is shown in Patent No. 1,878,156 of September 20, 1932, to Edward H. Lorenz, assignor to Hartford-Empire Company. In Fig. 2, the oscillating transfer arms, designated 64 and 65, respectively, of this stacker, are shown in positions to transfer ware from the spotting mechanism to a lehr conveyor 66. The spotting mechanism just described may be used to transfer articles of glassware singly from the spotting mechanism to such a lehr conveyor, in which event the transfer arms 64 and 65 would each be provided with a single tongs as disclosed in the aforesaid Patent No. 1,878,156 and each of such transfer devices would in its turn pick up an article of glassware at the same pick up position on the dead plate 52 and transfer it to the lehr conveyor. The spotting mechanism may, however, be used for the transfer of articles of glassware, two at a time, from the spotting mechanism to the lehr conveyor. The transfer arms 64 and 65 are then equipped with duplex tongs, indicated at 67 in Fig. 2, and as disclosed in Patent No. 1,905,476, of April 25, 1933, to Edward H. Lorenz, assignor to Hartford-Empire Company.

In the operation of the glassware spotting mechanism for the transfer of articles, two at a time, from the spotting mechanism to the lehr conveyor, the pick up positions may be at any two adjacent stations over the dead plate to which such articles are moved in turn by the rotation of the spotting wheel. The oscillations of the transfer arms of the stacker will be timed so that there will be four indexing movements of the spotting wheel for each complete ware transferring movement of each of the stacker arms 64 and 65, these arms operating alternatively. When the articles are to be transferred singly from the spotting mechanism to the lehr conveyor, the transfer arms and the indexing movements of the spotting wheel will be relatively timed so that there will be two indexing movements for each complete ware transferring oscillation of each transfer arm.

It will be obvious that the spotting mechanism can be located suitably to cooperate with the oscillatory transfer arms of an associate stacker for the desired transfer of articles from the incoming conveyor to the lehr conveyor, more or less irrespective of the particular angular relation of the incoming or supply conveyor to the lehr conveyor in any given situation. A pin 68, Fig. 3, depends from the lower bracket arm 11 into a fork 69 of a retaining arm 70 on the stationary tubular member 2 to prevent rotation of the shaft and the parts carried thereby when such shaft is adjusted vertically.

If the situation requires, the spotting wheel 38 may be inverted, a dead plate may be provided at the opposite side of the conveyor 51 from the position shown in Figs. 1 to 3, inclusive, and the motor 13 may be reversed to reverse the direction of rotary movements of the spotting wheel.

In the modification partially shown in Fig. 5, a spotting wheel 38' has twice as many peripheral pockets 48' as there are peripheral recesses 50' in the associate indexing disk 37'. This type of mechanism is adapted for use with an incoming conveyor, designated 51', by which articles of glassware 49' are brought to the spotting mechanism in two parallel rows. Two of such articles will enter adjacent pockets of the spotting wheel simultaneously and will be moved simultaneously by a single indexing movement of the connected spotting wheel and indexing disk. The operation of this form of the device will be readily understood without any detailed explanation thereof.

I do not wish to be limited to the exact details of the illustrative embodiments of the invention shown in the accompanying drawings and herein described as numerous changes therein and modifications thereof will now be apparent to those skilled in the art.

I claim:

1. In a glassware spotter, a floor stand comprising a flat base and an upright tubular member thereon, a shaft projecting upwardly from said tubular member and being vertically and angularly adjustable relatively to said tubular member, means for fastening said shaft to said tubular member in an adjusted position, a cap sleeve carried by said shaft, a laterally extending arm on said cap sleeve, a horizontally disposed spotting wheel rotatably supported by said arm, a second laterally extending arm on said sleeve, a driving unit mounted upon said second named arm, and motion-transmitting means supported upon said cap sleeve and operatively connecting said driving unit and said spotting wheel to tend to rotate said spotting wheel continually, said motion-transmitting means including a friction coupling or clutch comprising relatively rotatable frictionally contacting elements between which slippage may occur when an obstruction is opposed to rotation of said spotting wheel, and means carried by said first named lateral arm periodically to oppose such obstruction to the rotation of the spotting wheel.

2. A spotting mechanism as recited in claim 1 wherein the means periodically to oppose an obstruction to the rotation of the spotting wheel comprises an indexing disk connected to the spotting wheel to turn with it about the axis of rotation of the spotting wheel, said indexing disk having a series of recesses therein arranged in a circle about said axis of rotation, a cylinder carried by said first named lateral arm adjacent to said indexing disk, a piston reciprocable in said cylinder, a detent reciprocable by the piston between a projected position in which the detent will engage with each recess in the indexing disk when that recess is moved into the path of the detent and a retracted position at which the detent will be clear of said recess, spring means acting on said piston to tend to maintain said detent in its projected position, and means periodically to apply a puff of air in the cylinder at the side of the piston opposite said spring means to effect retraction of the detent against the action of said spring means.

STANLEY P. CLARK.

REFERENCES CITED

The following references are of record in the file of this patent:

UNITED STATES PATENTS

| Number | Name | Date |
| --- | --- | --- |
| 745,217 | Mensing | Nov. 24, 1903 |
| 1,009,090 | Parker | Nov. 21, 1911 |
| 1,116,558 | Bruns | Nov. 10, 1914 |
| 1,528,536 | De Walt | Mar. 3, 1925 |
| 1,878,156 | Lorenz | Sept. 20, 1932 |
| 2,209,858 | Steiert | July 30, 1940 |
| 2,258,828 | Trebert | Oct. 14, 1941 |